Feb. 13, 1934.     G. L. COVINGTON     1,947,035
GOLD SAVING APPARATUS
Filed Aug. 1, 1931     2 Sheets-Sheet 1

INVENTOR
General L. Covington
BY J. K. Rivers,
ATTORNEY

Feb. 13, 1934.　　　G. L. COVINGTON　　　1,947,035
GOLD SAVING APPARATUS
Filed Aug. 1, 1931　　　2 Sheets-Sheet 2

INVENTOR
General L. Covington
BY J. R. Rivers
ATTORNEY

Patented Feb. 13, 1934

1,947,035

UNITED STATES PATENT OFFICE 1,947,035

GOLD-SAVING APPARATUS

General L. Covington, Chehalis, Wash.

Application August 1, 1931. Serial No. 554,440

6 Claims. (Cl. 209—12)

This invention has reference particularly to improvements in the type of gold-saving apparatus disclosed in my pending application for Letters Patent of the United States, Serial No. 282,899, filed June 5, 1928, and which has ripened into Patent No. 1,815,548, issued July 21st, 1931, said apparatus being especially adapted for working placer deposits, and is one wherein novel gold-saving elements are utilized in the bottom of a hopper and sluice boxes provided.

One of the objects of the invention is, to provide in such apparatus more effective instrumentalities, including traveling grizzly screens, for segregating coarse unworkable material from the finer placer material and also preventing a clogging of the apparatus from material dumped therein.

A further object is, to provide, in cooperation with said screens, diverting pans and grizzly bars which act on said finer material as it is sluiced through the apparatus preparatory to entering said sluice boxes, the same serving to screen, break up and scour said material.

A still further object is, to provide a plurality of sluicing floors, equipped with said gold-saving elements, to which said finer material is carried and subjected to the action of said elements during the progress of the screening, breaking up and scouring of said material.

Other objects, capabilities and advantages will appear as the description of the invention proceeds.

In the accompanying drawings—

Figure 1:
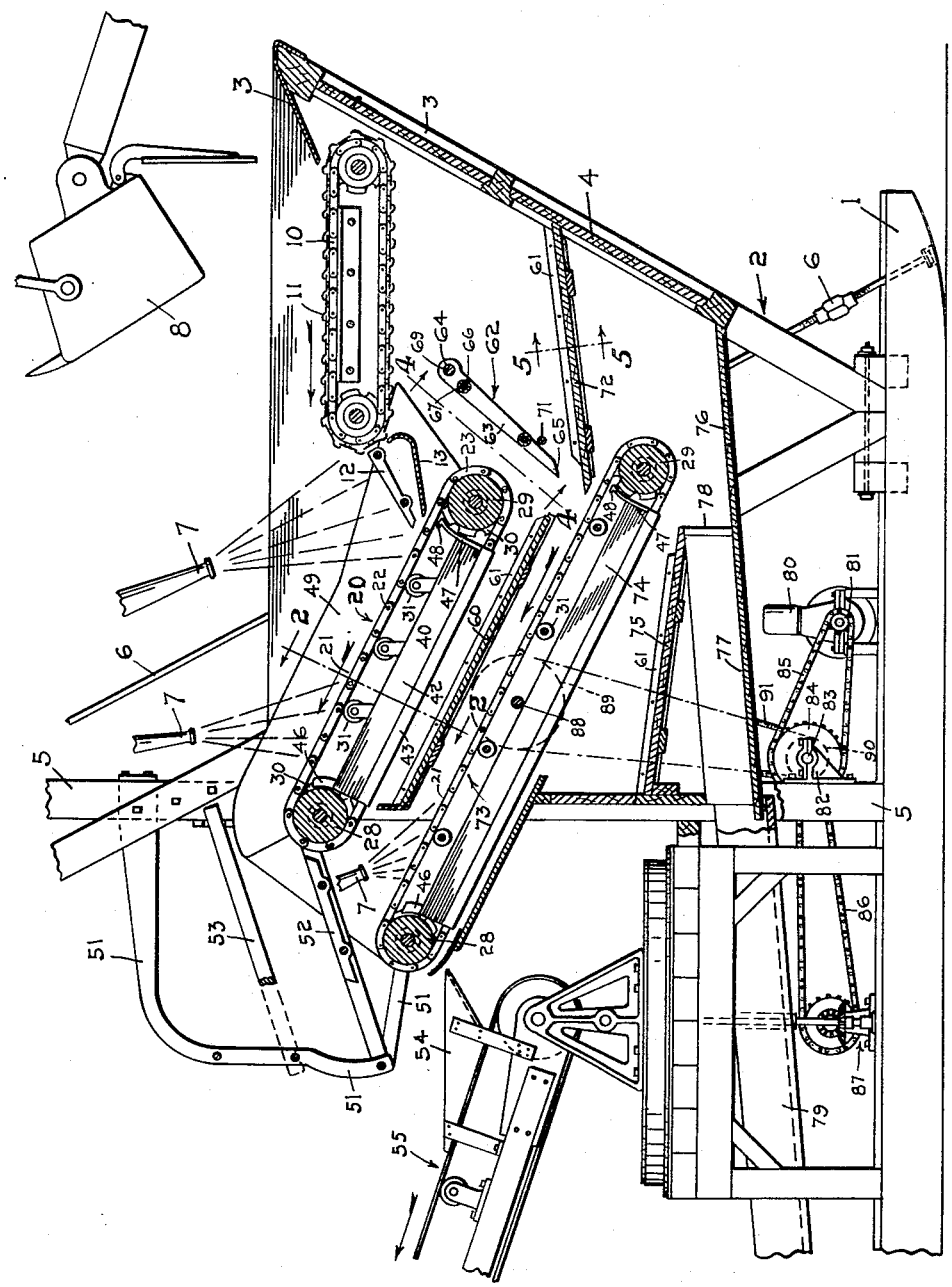
Figure 1 is a side elevation of the apparatus, including portions of a steam shovel, the main hopper and instrumentalities mounted therein and immediately associated therewith being shown in vertical section and about centrally of the apparatus, certain parts of the same indicated as broken way.
Figure 5:
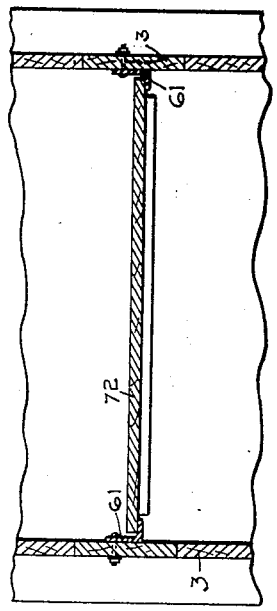
Fig. 5 is a cross section drawn on the line 5—5, of Fig. 1, indicating a sluice floor and the manner in which it is detachably mounted in the main hopper.

Referring again to the drawings and in a more specific way, 1 designates a skid on which the apparatus is mounted to render it portable, 2 generally denotes a frame, 3 the main hopper built into said frame and elevated above the skid, 4 a door for the hopper, and 5 a mast disposed at each side of and extending above said hopper. Each of said masts, if desired, may be stabilized by an assembly of stay rods controlled by a turnbuckle and designated as 6, the lower end of each assembly being preferably secured to the skid 1, as shown in Fig. 1, and the upper end, shown as broken away, may be secured in a like manner to the adjacent mast. This stay rod mechanism is illustrative only, and, as is evident, any other suitable means may be provided for imparting rigidity to said masts. Water is sluiced to the apparatus by a plurality of nozzles, each denoted as 7, which are operatively connected with a suitable source of water supply, and the placer material to be worked is ordinarily designed to be dumped into the apparatus by a steam shovel, the scoop of which is shown and designated as 8.

Assuming that said material is being thus dumped into the hopper, it is first deposited on an apron feeder 10, operatively mounted in the hopper. Said feeder is a device commonly employed in conveying heavy material, and includes an endless traveling belt 11, constructed preferably of heavy steel.

Said material is conveyed by the apron feeder to an assembly of inclined grizzly bars 12, where it is subjected to the first sluicing operation by water being forced to it from the adjacent nozzle 7, the sluice pan 13, disposed under said bars, permitting the water to take hold of the material. Said bars 12 are designed to be spaced rather closely together, and as the material travels over said bars, the larger portions thereof, in particular, receive a cleaning and scouring, and the sand and soil contained in the material descend through the bars 12 to the sluice pan 13.

Through this initial sluicing operation and the continued movement of the apron feeder in supplying additional material to the hopper, the material disposed on said bars and in said pan next passes to the first traveling grizzly screen, generally denoted as 20. The screen member 21 thereof comprises an endless structure formed from rods 22, links 23 and spacers 24, made preferably of heavy steel, and the assembly being secured together by the cotter pins 25, or any other suitable fasteners, located at the ends of each rod. The links and spacers are obviously mounted on the rods so as to impart flexibility to the screen member, and the meshes, designated as 26, may be for practical purposes large enough to permit gravel having stones up to eight inches in diameter to readily enter and pass therethrough. The meshes 27 at each side of said member are reduced in width for a purpose which will presently appear.

The traveling grizzly screen includes further, a driving roller 28 and an idler roller 29, each journaled in said hopper and provided at each end with a sprocket wheel 30 fixedly secured thereto. The screen member 21 is mounted on said rollers so as to revolve when movement is imparted to the driving roller, the teeth of the sprocket wheels 30 being engageable with the meshes 27 and the meshes having a width which will accommodate the teeth of said wheels without undue side play. In order to provide additional support for the member 21 and to facilitate its movement, a plurality of rollers are installed in said hopper, each being denoted as 31 and mounted on a stub shaft 32. The said rollers extend inwardly from each side of the hopper and are engageable with the under side edge portions of the member 21, as more particularly appears in Fig. 2.

Assisting in the operation of the screen 20 and cooperating with said screen in segregating the material, as will be described in order, is a diverting pan 40, the same being disposed below the upper portion of the screen member 21 and above and straddling the lower portion of said member. The pan 40 is provided with a central ridge portion 41 and side portions 42, each of said side portions sloping downwardly from the portion 41 in an opposite direction, and terminating in a right angular edge portion 43 located inwardly of and spaced away from the adjacent side of the hopper. For securing the pan 40 in place, a plurality of supports 44 are provided, the same being so located as to support said pan from underneath it and thereby provide smooth uninterrupted upper side portions for the pan. As it may be noted in Fig. 2, one of these supports is indicated, its ends extending through the edge portions 43—obviously cut out to receive them—and said ends bolted to the sides of the hopper, as at 45. 46 denotes an upstanding and curved guard member secured to each side of the pan 40 and located adjacent each of the sprocket wheels 30 of the driving roller 28, adapted to protect said wheels from the clogging action of material passing through the screen member 21. The idler roller 29, located as it is at a lower level than the roller 28, obviously requires a more complete protection from said action of the material and the water used in sluicing, and with this end in view a guard 47 is provided. The guard 47 is curved and upstanding and formed so as to afford an inwardly extending flange 48 for directing said material and water away from the roller 29. This guard 47 extends for the full length of the roller 29 and between the adjacent end of the diverting pan 40 and said roller, it having water-tight connections with said end and the hopper.

Figure 2:
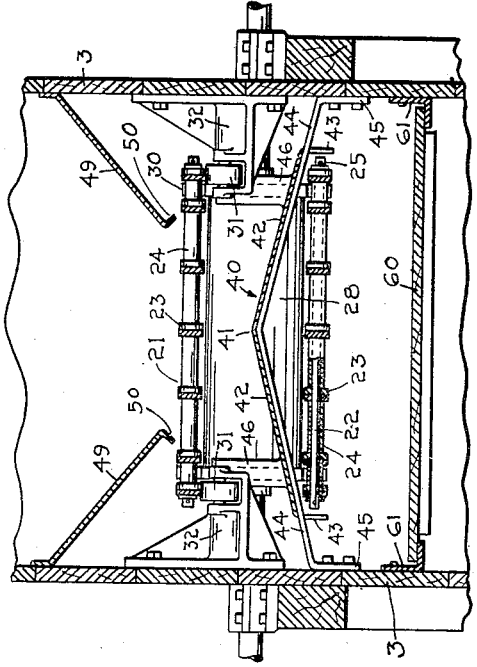
Fig. 2 is a cross section drawn on the line 2—2, of Fig. 1, being designed to more particularly show the first of said traveling grizzly screens, a shaft through which movement is imparted thereto, a diverting pan adapted to operate in connection with said screen, and a sluice floor disposed below said screen and pan.

For the purpose of directing said material to the screen member 21, a guide member 49, having its lower edge disposed angularly, as at 50, extends from each side of the hopper and longitudinally of and beyond said screen member, as shown in Fig. 1, and is located directly above it, as is indicated more particularly in Fig. 2.

As said material is carried along the screen 20, it is again subjected to a sluicing operation by water being forced to it through the nozzle 7 located adjacent to said screen. The material which is too bulky to fall or be forced by the water and the movement of the screen through the meshes 26 of the screen member 21, again, receives a cleaning and scouring, and pay dirt clinging thereto will pass through said screen member.

A projecting frame 51, one side of which is shown in Fig. 1, is supported by the masts 5, said frame being designed to be of substantial construction, preferably of steel bars. Said frame is provided with side portions of identical construction, each extending from one of said masts, and braced by suitable cross members. 52 denotes an assembly of grizzly bars mounted in the frame 51, and 53 a shearing bar secured at one end to the rearward mast 5 and at its other end to the forward side portion of the frame 51, said bar occupying a diagonal and inclined position across said frame. As it may be noted in Fig. 1, the bar 53 is shown as sectionized and then continued for its length in dotted lines, to indicate, as is evident, that its forward end is secured to the side of the frame 51 which is not shown in said figure.

Said bulky material having been advanced along the screen 20 through the movement of said screen, is now forced on to the grizzly bars 52, and thence normally drops into the hopper 54 of the endless conveyer, generally designated as 55, by which it is carried away as tailings. This conveyer, mounted on a turntable and adapted to be swung into different positions through block and tackle means, is practically of the same construction as the like device disclosed in my said patent, and constitutes no part of this invention, hence it is shown as broken away and the details of its construction and mode of operation are not described.

Should said material contain stones, or the like, of certain large sizes, or tree roots, or other bulky and unworkable material, the shearing bar 53 is designed, as the said material moves down the grizzly bars 52, to impart a shearing stress to said stones or other matter and shear the same to one side so that they may fall off of the apparatus and thereby relieve said conveyer of the burden of transporting them, and possibly prevent a clogging up of the hopper of said conveyer.

The material passing through the screen member 21 falls to and is forced against the diverting pan 40. This pan performs more than a single duty in that it provides a hood over the lower portion of the screen member 21 and protects the same from material as it is screened by the upper portion of said member, and acts as a support for sprocket and roller-protecting elements, as described. It also, through its central ridge and sloping sides and in cooperation with the water directed to it, serves to break up the material and permits it to pass to an inclined sluice floor 60 where the next step in its treatment is effected. Said floor, in the present embodiment of the invention, is of wood construction, as shown, but it obviously may be of metal, if desired. It is detachably mounted in the main hopper, being supported on each side by angle iron members 61 bolted to said hopper, and to which members it may be suitably secured in place.

On the floor 60 is mounted an assembly of the gold-saving elements disclosed in my said patent, including sections and strips of carpet, riffles and screens, and fastening means, which may be installed on the floor as suggested by the arrangement of the same shown in Fig. 8 of the drawings of said application, or operatively arranged in any other appropriate way. As the screened material is sluiced over this floor, the first gold-saving operation takes place, said gold-saving elements catching and retaining gold in the manner described in said application.

Figure 4:
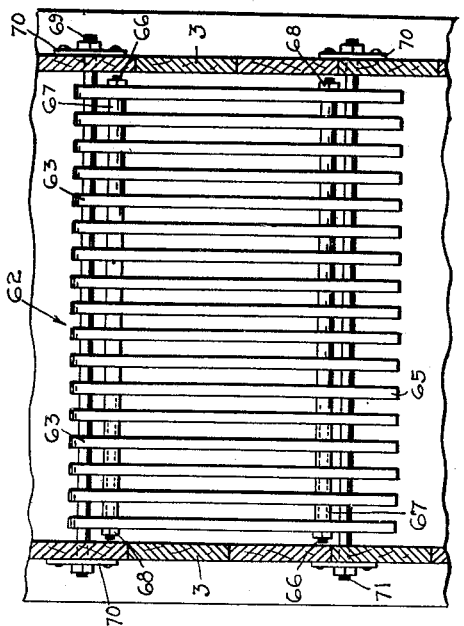
Fig. 4 is a view drawn along the line 4—4, of Fig. 1, illustrating in front elevation a series of grizzly bars.
Figure 3:
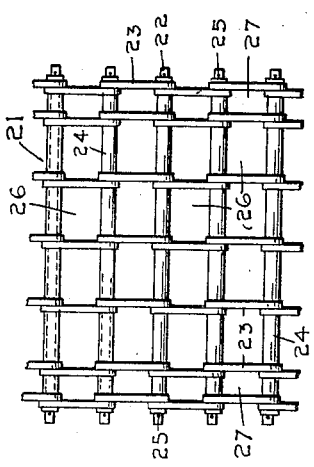
Fig. 3 is an elevation of a portion of a grizzly screen, indicating the construction of the screen member thereof more in detail.

Said material, having passed over the floor 60, is then forced against an assembly of grizzly bars, designated generally as 62. Said assembly of bars as shown in Fig. 4, while illustrative of a construction which may be utilized for the grizzly bars denoted as 12 and 52, if desired, is particularly designed to perform a breaking function in addition to the usual functions of grizzly bars, such for instance as screening or draining. With this end in view, the assembly of grizzly bars 62 is larger, made of heavier material, and the bars spaced farther apart than said bars 12 and 52, and it is swingingly mounted in place so that it may be readily lifted to permit access to the floor 60 in making a clean-up, as will hereinafter more particularly appear. Said assembly 62 comprises the bars 63, preferably of steel, each bar being provided with one end enlarged and carrying an eye 64 and its other end beveled, as at 65, and said bars secured together by the rods 66 and the spacers 67 held in place by the nuts 68. The rod 69, engageable with the eyes of said bars, is secured to the main hopper and a plate 70 provides at each end of said rod a reenforced connection with said hopper, the bars as thus mounted being adapted to swing on said rod as a unit. 71 denotes a rod secured to the hopper and having reenforced connections therewith in the same manner as the rod 69, this rod, however, serving as a support against which the lower ends of the bars 63 are adapted to rest. With these mountings said bars may be swung inwardly to a limited extent, but should it be desired to swing the bars outwardly and toward the door 4, it will be necessary to remove the rod 71 from said hopper.

As said material is projected against the assembly of grizzly bars 62 considerable force is applied to it, through the action of the water used in the sluicing operation, the inclination of the floor 60 and the weight of the material itself. It is then further scoured and broken up as it strikes said assembly and is forced on or therethrough, the water and smaller portions passing through the bars and on to a second sluice floor 72, the larger and smaller portions of said material being segregated by said bars. This second sluice floor is inclined downwardly somewhat less than said floor 60 and occupies a position reversely thereof. It is, however, of identically the same construction and carries gold-saving elements of the same kind and mounted in the same way as those carried by the floor 60. As it may now be noted the flow of the material and water becomes reversed, the larger portions of said material drop from the assembly 62 to a second traveling grizzly screen, generally denoted as 73, and the material deposited on the sluice floor 72 is sluiced and gravitates to said screen 73 also, the gold-saving elements acting upon the material as it is brought into contact therewith while being transferred to and from said floor.

The traveling grizzly screen 73 has its driving roller mounted in the frame 51, and while it has a greater length than the screen 20 it is of somewhat lighter construction, and its screen member is provided with meshes which are smaller than the meshes of the screen member 21, the same preferably being of a size which will permit gravel one inch or less in diameter to pass through. Otherwise, it is identical in construction and mountings with the screen 20, and its parts are given the same numerical designations as have been assigned to said screen. A diverting pan 74 is also provided in connection with the screen 73, said pan being of a length to accommodate it to said screen, but in other respects it is the same in construction and mode of operation as said pan 40, and its specific parts are denoted by the same numerals as given to the parts connected with the pan 40.

The larger portions of said material having passed to the screen 73, as heretofore described, said portions and the material deposited on the sluice floor 72 are subjected to a further sluicing from water projected from the nozzle 7 located adjacent to the screen 73, and in which said material is again scoured. The material on the sluice floor 72, through the inclination of said floor and the sluicing action of the water, is brought to the screen 73 where all of the material is screened, the larger portions being carried by said screen to the hopper 54 thence taken away as tailings by said conveyor 55, and the screened portions being brought into contact with the diverting pan 74. As is obvious, the last-named material, which it may be observed is now free from portions exceeding one inch in diameter, passes over said pan 74 and receives the same treatment as heretofore described relative to the pan 40. This material then passes to a third inclined sluice floor 75 disposed below said floor 72 and providing a reverse flow for said material.

The sluice floor 75 is constructed in the same manner as the other sluice floors described, and carries a like assembly of gold-saving elements. The screened material is then sluiced along the floor 75, where it is acted upon by said elements, and passes next to the floor 76 of the main hopper, which floor constitutes what I term, the head of the main sluice, and is inclined in a direction reversely of the floor 75. The floor 76 is also provided with a like assembly of gold-saving elements which act upon the material as it is sluiced along said floor in a reverse direction, whence it enters a sluice box, denoted as 77. The sluice box 77 is practically of the same construction as the sluice box which initially receives the material from the hopper in the apparatus disclosed in my said patent, and like it is partitioned longitudinally so as to afford a double sluice box, for the purposes indicated in said patent. A gate is designed to be installed at the inner end of said box, as at 78, and it may be constructed as described in my said patent and illustrated in Fig. 7 of the drawings thereof, or any other suitable gate may be provided which will permit either of the partitioned sections of the box to be selectively closed while the other of said sections is open to receive the flow of material from the floor 76. As the specific construction of said gate does not constitute a part of this invention, its details are not shown.

Connected with the sluice box 77 are a plurality of sluice boxes 79 and which, in cooperation with said box 77, provide the main sluice of the apparatus. Each of the boxes 79 is also provided with a longitudinal partition, the same affording in connection with the partitioned sections of the box 77, two separate and continuous passages for the material designed to flow therethrough for the purposes detailed in said patent. The box 77 and the boxes 79 are also provided with assemblies of the gold-saving elements heretofore referred to and installed as particularly appears in said patent.

As is evident, said material as it passes into said box 77 is sluiced therethrough and then through the boxes 79, where it is acted upon by the gold-saving elements. In the main sluice thus provided, the material receives continuous and extended treatment effective in catching the placer gold contents thereof.

Motion may be imparted to the traveling instrumentalities described through the application of any suitable power and as illustrative of means appropriate for this purpose, I show a gasoline engine 80 having a sprocket wheel 81 rotatable with the drive shaft of said engine. 82 denotes a bracket secured to each of the masts 5 and disposed directly underneath the sluice box 77, and 83 a shaft journaled in said brackets. The shaft 83 carries a sprocket wheel 84, and power from the engine is transferred to said shaft through the chain 85 connecting the sprocket wheels 81 and 84. I claim no inventive concept in the particular means for applying said power, hence the mechanism for producing this result is illustrated only in a general way, but which will be understood by those skilled in the art. With a suitable sprocket wheel mounted to the shaft 83, power may be applied to said rotary conveyor through the chain 86 acting upon the instrumentalities generally designated as 87, Fig. 1. 88 denotes a stub shaft mounted to the main hopper and exteriorly thereof, 89 a sprocket wheel fixed to the stub shaft, 90 a sprocket wheel mounted on the shaft 83, and 91 a chain connecting said sprocket wheels and through which motion may be imparted to the shaft 88. Fixed to the shaft 88 are sprocket wheels designed to be connected by chains with sprocket wheels operatively secured to the shafts of the drive rollers of the apron feeder 10, and the traveling grizzly screens 20 and 73, and which obviously serve to impart motion to these devices. All of the wheels and chains associated with the devices last named are designed to be located exteriorly of the main hopper so that they will not obstruct the flow of the material or be clogged thereby, and the bearings of the shafts, where practical, are designed to be protected from the action of said material and the water used in sluicing.

In making a clean-up of the main hopper, access may be had thereto through the door 4, when said sluice floors may be removed, and gold retained by the gold-saving elements thereon and disposed on the floor 76 may be reclaimed in the manner detailed in my said application. A clean-up of said sluice boxes may also be made in accordance with the description contained in the same application.

From the foregoing it may be seen that in the present apparatus as compared with the apparatus of my copending application, I provide a more tortuous course for the flow of the material and devices which accord a more thorough treatment thereto preliminary to its entry into the main sluice, which will prevent this apparatus from being clogged with unworkable material and put the workable material in better condition to be acted upon in the main sluice; and, also serve to catch and retain within the main hopper, as the material progressively passes therethrough, the placer gold contents thereof in a more effective and complete manner.

While I have shown and described certain construction for the first sluice floor 60 with certain gold-saving elements mounted thereon, it may be expedient when working with material in which large stones or gravel are unusually abundant, or in other circumstances, to provide a steel floor in lieu of the wooden floor shown and without gold-saving elements mounted thereon, as described. This will permit the material, after its initial screening and at a time when it may contain a relatively large quantity of bulky stones or gravel, to have an uninterrupted passage to the grizzly bars 62, and through the impetus thus gained cause said bars to function more effectively in breaking up said material, or possibly prevent a clogging of the material. Also, while the gold-saving elements referred to are preferably utilized in this apparatus, riffles of various kinds and other gold-saving elements may be employed in said hopper and the sluice boxes, if desired.

Other changes in and modifications of the construction described may be made without departing from the spirit of my invention or sacrificing its advantages, therefore it is asked that I be not confined to the specific structure set forth, except as limited by the appended claims.

I claim:

1. In a gold-saving apparatus, a feeder for placer material, a traveling grizzly screen device operative on said material in screening the workable portions from the unworkable portions, a diverting pan for receiving and discharging the screened material, an inclined sluice floor for receiving the screened material from said pan, an assembly of grizzly bars operative on the screened material, a second sluice floor disposed below said bars and inclined in a direction reversely of the first sluice floor, a second traveling grizzly screen device for receiving the material from said bars and the second sluice floor and separating said material so as to provide finer workable portions, a third sluice floor disposed below said second device and inclined in a direction reversely of the second sluice floor, and gold-saving elements mounted on one or more of said floors.

2. In a gold-saving apparatus, instrumentalities providing a flow for placer material, comprising a feeder, an assembly of grizzly bars, a sluice pan associated with said bars, a traveling grizzly screen device for screening from said material the workable portions from the unworkable portions, a diverting pan operative on the screened material, an inclined sluice floor for receiving the material from said pan, a second assembly of grizzly bars operative on the screened material, a second sluice floor, a second traveling grizzly screen device for receiving material from said second bars and the second sluice floor and providing finer constituents for the workable portions, and a third sluice floor for receiving the material screened through said second screen device.

3. In a gold-saving apparatus having means for sluicing water therethrough; a hopper, and means operatively mounted in the hopper for providing a flow of placer material, comprising an endless revolving screen adapted to screen the workable portions from the unworkable portions of said material and discharge said unworkable portions exteriorly of the hopper, a diverting pan for receiving and discharging the screened material, an inclined sluice floor for receiving the screened material from said pan, an assembly of grizzly bars associated with said floor and instrumental in breaking up and scouring the screened material, a second sluice floor, and an endless revolving screen having meshes smaller than the meshes of the first-named screen, adapted to deposit the finer portions of the advancing material into the hopper and discharge the coarser and refuse portions thereof exteriorly of the hopper.

4. In a gold-saving apparatus, means providing a flow for placer material, comprising a traveling grizzly screen device for screening from said material the workable portions from the unworkable portions, an inclined sluice floor, a pan for diverting the screened material from said device to said floor, an assembly of grizzly bars instrumental in reversing the flow of the screened material, a second sluice floor, and a second traveling grizzly screen device for receiving material from said bars and the second sluice floor and segregating the material last-named so as to provide finer constituents for the workable portions thereof.

5. In a gold-saving apparatus having sluicing means; and endless revolving screen adapted to segregate the workable portions from the unworkable portions of placer material, an inclined sluice floor disposed below said screen for receiving and directing the floor of material passed through said screen, and a grizzly bar assembly disposed oppositely of said floor and inclined in a direction reversely thereof, said assembly being adapted to break up and permit a scouring of material sluiced from said floor.

6. In a gold-saving apparatus having means for sluicing water; a traveling grizzly screen device provided with a screen member having relatively coarse meshes, a sluice floor for receiving and directing a flow of placer material screened through said member, grizzly bars, reversely inclined relatively to said floor, for reversing the flow of the screened material, and a second traveling grizzly screen device provided with a screen member having finer meshes for subjecting the advancing material to a further and finer screening and thereby render it more workable in character.

GENERAL L. COVINGTON.